Aug. 30, 1932.    M. W. McCONKEY    1,875,081
METHOD OF MAKING BRAKES
Filed July 16, 1927    3 Sheets-Sheet 1

INVENTOR
Montgomery W. McConkey

Aug. 30, 1932.  M. W. McCONKEY  1,875,081
METHOD OF MAKING BRAKES
Filed July 16, 1927  3 Sheets-Sheet 2

INVENTOR
Montgomery W. McConkey

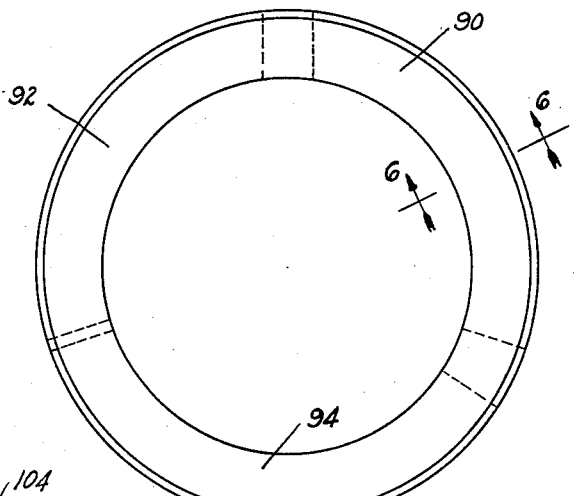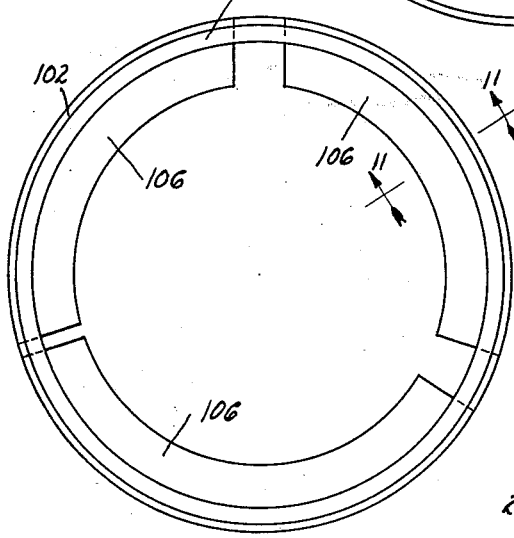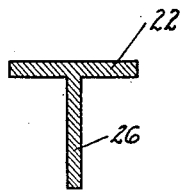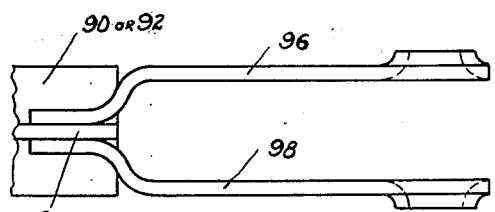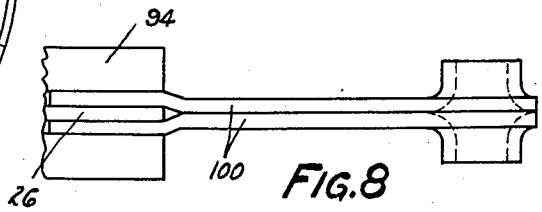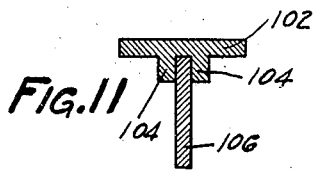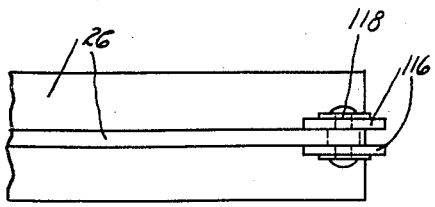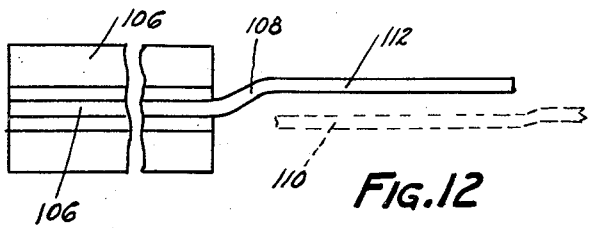

Patented Aug. 30, 1932

1,875,081

UNITED STATES PATENT OFFICE

MONTGOMERY W. McCONKEY, OF SOUTH BEND, INDIANA, ASSIGNOR TO BENDIX BRAKE COMPANY, OF SOUTH BEND, INDIANA, A CORPORATION OF ILLINOIS

METHOD OF MAKING BRAKES

Application filed July 16, 1927. Serial No. 206,264.

This invention relates to brakes and is illustrated as carried out in the manufacture of several different forms of internal expanding brakes for automobiles.

One phase of the invention has to do with the manufacture of brakes by forming a ring which is T-shaped in cross-section and then separating it into segments arranged end to end, enough material being removed at least between two of the segments to permit spacing them apart for the applying of anchoring means. In one arrangement two adjacent shoes have overlapping parts cut from the same segment of the web of the ring which is made wide enough to permit the overlapping parts to be formed in that manner. It is also possible to make these shoes by the use of a ring having spaced flanges on its inner periphery with stiffening web members secured between the spaced flanges.

Other features of novelty relate to the arrangement of a brake with one of the shoes anchored on a thrust link which is pivoted at one end to the shoe and which at its other end is mounted on a pivot between the ends of the adjacent shoe or the like. I prefer to arrange the pivot for the end of this thrust link as a connection to the web of said adjacent shoe. This arrangement is especially advantageous with a brake of the three-shoe type in which an anchored secondary shoe is operated by a floating primary shoe and the above-described link anchor is used for an auxiliary shoe arranged at the anchored end of the secondary shoe.

Other features of novelty relate to certain structural details of the brake shoes and to other novel and desirable details of construction which will be apparent from the following description of the brakes shown in the accompanying drawings, in which:

Figure 5 is an elevation of a ring similar to the one shown in Figure 1 but showing a third manner of removing part of the material to form brake shoes;

Figure 6 is a section through the rings of Figures 1, 3, and 5 on the line 6—6 of each of these figures;

Figure 7 is an inside plan view of one of the end shoes made with the segments indicated by dotted lines in Figure 5;

Figure 8 is an inside plan view of the anchored end of the secondary shoe made with the segments shown in Figure 5;

Figure 9 is an inside plan view of the cam end of either the primary or auxiliary shoe made with the ring shown in Figure 5;

Figure 10 is a side elevation of a ring made with spaced parallel flanges on its inner periphery and between which are arranged arcuate flat webs which form the stiffening webs of the finished shoes;

Figure 11 is a section through the ring of Figure 10 on the line 11—11 of Figure 10; and Figure 12 is an inside plan view of one of the shoes of Figure 10 but showing a somewhat different arrangement in which the separate stiffening web is extended at the end of the shoe to form a pivot arm.

Figure 1:
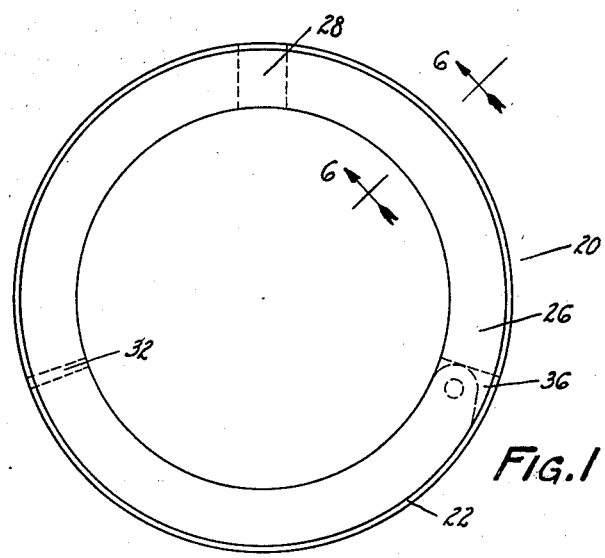
Figure 1 is a side elevation of a T-section ring with the material to be removed indicated by dotted lines.
Figure 2:
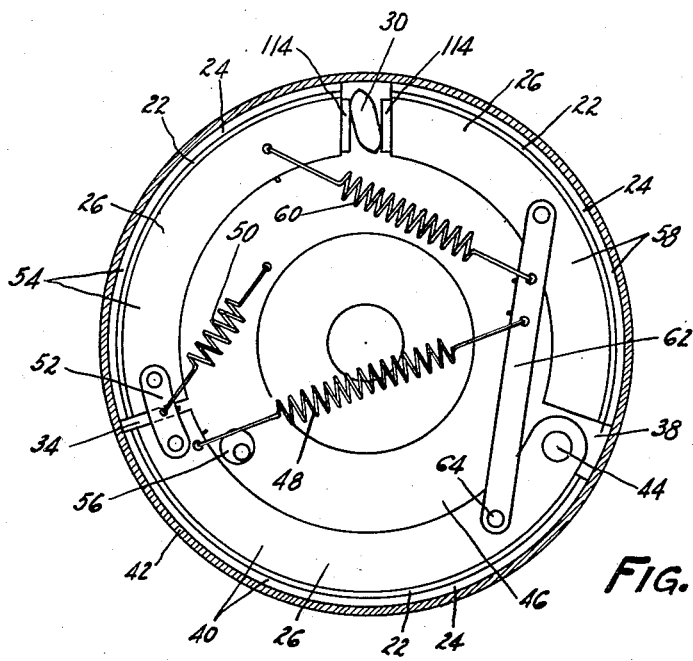
Figure 2 is a vertical section through a brake made from the ring shown in Figure 1, the section being taken just inside the head of the brake drum and showing the shoes in side elevation.

In the arrangement shown in Figures 1, 2, and 6, there is a ring 20 of material such as rolled steel, and which is T-shaped in cross-section to form an outer cylindrical face 22, to which the brake lining 24 may be riveted or otherwise secured, and a central stiffening web 26. In cutting the ring into segments to form a plurality of shoes, the material indicated by dotted lines in Figure 1 is removed. The material 28 is removed to form a space for the brake-applying cam 30 and the material 32 is removed to provide a clearance 34 between the primary and secondary shoes of the brake, while the material 36 is removed to give the clearance 38 between the secondary and auxiliary shoes of the brake.

The brake made with the segments so formed is shown in Figure 2. This brake includes a secondary brake shoe 40 arranged within a rotatable brake drum 42 and anchored on a pivot 44 secured to a backing plate 46 at the open side of the brake drum. The secondary shoe 40 is urged away from the drum when the brake is released by a spring 48 connected directly to the shoe and a spring 50 connected to a pair of links 52 on opposite sides of the webs of the shoes and pivotally connecting the secondary shoe 40 to a primary shoe 54 engaged by the operating cam 30. The idle position of the secondary shoe 40 may be determined by a suitable adjustable stop 56. The auxiliary shoe 58, which is also operated by cam 30 against the resistance of a main return spring 60, is pivotally connected to one or a pair of thrust links 62 which are mounted at their lower ends on a pivot 64 arranged between the ends of the secondary shoe 40 and which I prefer shall connect the links 62 to the web 26 of the shoe 40. The return springs 48 and 60 are shown connected to the link 62 and urging the shoe 58 away from the brake drum.

Figure 3:
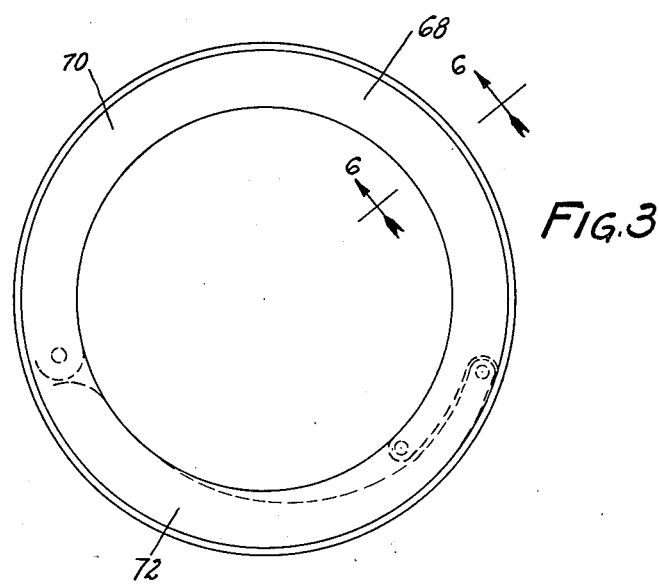
Figure 3 is a side elevation of the ring similar to the one in Figure 1 but indicating by dotted lines how the material may be removed in a somewhat different manner to permit the overlapping of two of the shoes.
Figure 4:
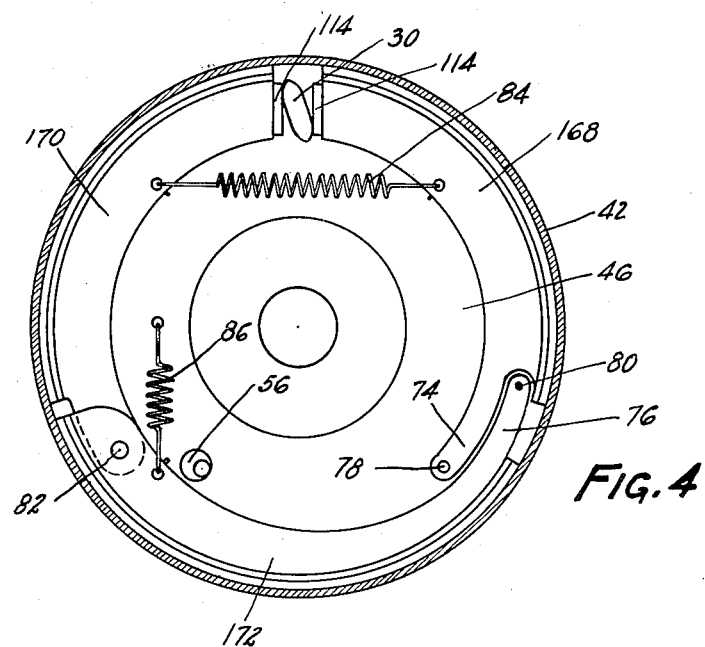
Figure 4 is a vertical section corresponding to Figure 2 but showing a brake made with the shoes formed from the ring shown in Figure 3.

The ring shown in Figure 3 has material removed as indicated by the dotted lines to form three segments 68, 70, and 72 forming shoes 168, 170, and 172 in the brake shown in Figure 4. One peculiarity of this construction is that the stiffening webs of the shoes 168 and 172 are cut from the same sector of the ring shown in Figure 3 in such a manner as to form pivot arms 74 and 76 arranged in the same plane one inside of the other and mounted respectively on anchors 78 and 80. The remainder of the construction of the brake is substantially as in Figure 2, except that the shoes 170 and 172 are directly connected by a pivot 82, the stiffening webs being deflected slightly in opposite directions from the central plane to permit them to project past each other; and also in that main return spring 84, which is connected at its outside ends directly to the shoes 168 and 170, while the auxiliary return spring 86 is connected at one end to the shoe 172 and at the other end to the backing plate 46.

In the arrangement of Figure 5 the ring is separated into three segments 90, 92, and 94 by the removal of the material as indicated in dotted lines, the superfluous material being removed by straight cuts directly through the ring. The primary and auxiliary shoes are preferably provided with separate parts 96 and 98 welded or riveted or otherwise secured to the opposite sides of the stiffening web 26 and spread apart and extended as spaced parallel pivot arms adapted to straddle the opposite ends of the secondary shoe formed from the segment 94, substantially as described in Patent No. 1,567,716, granted Bendix Brake Company on December 29, 1925, on application of A. Y. Dodge. The secondary segment or shoe 94 is also provided with a pair of separate parts 100 riveted or otherwise secured to the opposite sides of its stiffening web 26, but in this case these parts are deflected into engagement with each other to form a double-thickness pivot arm to be mounted on the anchor of the shoe.

In Figures 10 and 11 ring 102 is formed with spaced parallel flanges 104 on its inner periphery between which there is welded or otherwise secured a plurality of flat web members 106 arranged end to end and which form the stiffening webs of the finished shoes.

As shown in Figure 12, the web 106 on one of these shoes may be deflected at 108 to avoid interference with the pivot arm 110 of the adjacent shoe, and extended as an overlapping pivot arm 112.

In Figures 2 and 4, the primary and auxiliary shoes are shown with hardened cam-engaging thrust plates 114 which may be welded or otherwise secured to the ends of the shoes. As shown in Figure 9, if preferred, the primary or auxiliary shoes may be provided with anti-friction rollers 116 mounted on a pivot 118 extending through the web 26 of the shoe and adapted to engage the operating cam 30.

While illustrative constructions have been described in detail, it is not my intention to limit the scope of the invention to those particular constructions or otherwise than by the terms of the appended claims.

The structure herein disclosed forms the subject matter described and claimed in my divisional application Serial No. 598,022, filed March 10, 1932.

I claim:

1. That method of manufacturing brakes which comprises forming a ring T-shaped in cross-section, separating the ring into segments arranged end to end and removing material between at least two of the segments to permit spacing the segments apart, and providing anchoring means for the segments and operating means for applying the segments as brake shoes.

2. That method of manufacturing brakes which comprises forming a ring T-shaped in cross-section, separating the ring into three segments arranged end to end and removing material between at least two of the segments to permit spacing the segments apart, providing anchoring means for the adjacent ends of two of the segments and operating means acting on two other adjacent ends of the segments, and pivotally connecting the third set of adjacent ends.

3. That method of manufacturing brakes which includes the steps of forming a ring T-shaped in cross-section and with a relatively wide web, and separating it into brake shoes having overlapping parts cut from the same segment of said web.

4. That method of manufacturing brakes which comprises the steps of forming a ring having a pair of spaced flanges on its inner periphery, and securing a flat web member between said spaced flanges.

5. That method of manufacturing brakes which comprises the steps of forming a ring having a pair of spaced flanges on its inner periphery, and securing a plurality of arcuate flat web members end to end between said spaced flanges.

6. That method of making a brake which comprises rolling an element to a T section, cutting and forming arcuate friction segments from said element, and mounting the segments on thrust links.

7. That method of making a brake which comprises rolling an element into an angular section, cutting and forming arcuate friction segments from said element, and mounting the segments on thrust links.

In testimony whereof, I have hereunto signed my name.

MONTGOMERY W. McCONKEY.